United States Patent [19]

Horvat

[11] Patent Number: 5,466,271
[45] Date of Patent: Nov. 14, 1995

[54] PRE-FILTER WITH ROTATING NOZZLE

[76] Inventor: Ivan J. Horvat, 1109 S. Belvidere Ave., Gastonia, N.C. 28054

[21] Appl. No.: 236,549

[22] Filed: Apr. 29, 1994

[51] Int. Cl.$^6$ ................................................. B01D 41/00
[52] U.S. Cl. ........................... 55/294; 55/340; 55/487; 95/278
[58] Field of Search ......................... 55/282, 290, 294, 55/338, 339, 340, 317, 318, 487; 95/278, 279

[56] References Cited

U.S. PATENT DOCUMENTS

| | | | |
|---|---|---|---|
| 2,391,863 | 1/1946 | Bowen | 55/340 |
| 3,377,780 | 4/1968 | Noland | 55/294 |
| 4,036,613 | 7/1977 | Brown et al. | 55/294 |
| 4,082,524 | 4/1978 | Noland | 55/294 |
| 4,222,754 | 9/1980 | Horvat | 55/283 |
| 4,364,755 | 12/1982 | Ferri | 55/290 |
| 4,373,939 | 2/1983 | Limbocker | 55/287 |
| 4,384,546 | 5/1983 | Stahl | 118/699 |
| 4,443,236 | 4/1984 | Peiler | 55/269 |
| 4,461,633 | 7/1984 | Bodovsky | 55/294 |
| 4,481,767 | 11/1984 | Stark | 60/303 |
| 4,509,961 | 4/1985 | Jones | 55/294 |
| 4,542,785 | 9/1985 | Bognall et al. | 165/95 |
| 4,689,055 | 8/1987 | Kochan | 55/96 |
| 4,697,356 | 10/1987 | Hüttlin | 34/57 |
| 4,700,492 | 10/1987 | Werner et al. | 34/32 |
| 4,921,511 | 5/1990 | Dreischmeir | 55/294 |
| 5,114,444 | 5/1992 | Stüble | 55/294 |
| 5,143,529 | 9/1992 | Means, Jr. | 55/290 |
| 5,182,832 | 2/1993 | McMahon | 15/304 |
| 5,215,562 | 6/1993 | Kaiser | 55/294 |

FOREIGN PATENT DOCUMENTS

| | | | |
|---|---|---|---|
| 841390 | 4/1952 | Germany | 55/294 |
| 56-46888 | 11/1981 | Japan | 55/294 |
| 343085 | 2/1931 | United Kingdom | 55/294 |

Primary Examiner—C. Scott Bushey
Attorney, Agent, or Firm—Rhodes, Coats & Bennett

[57] ABSTRACT

A pre-filter for removing lint particles from an air stream entering a filter system wherein an enclosed housing has an air inlet for receiving particle containing air from a remote source and an air outlet in communication with a filter system, a screen covering the air outlet, a vacuum nozzle having a lint inlet adjacent the screen surface, an air conduit having an intake opening communicating with the nozzle, an exhaust fan having an intake opening communicating with the air conduit discharge opening to draw lint containing air from the nozzle through the air conduit, and a drive mechanism for moving the nozzle lint inlet across the screen surface.

10 Claims, 5 Drawing Sheets

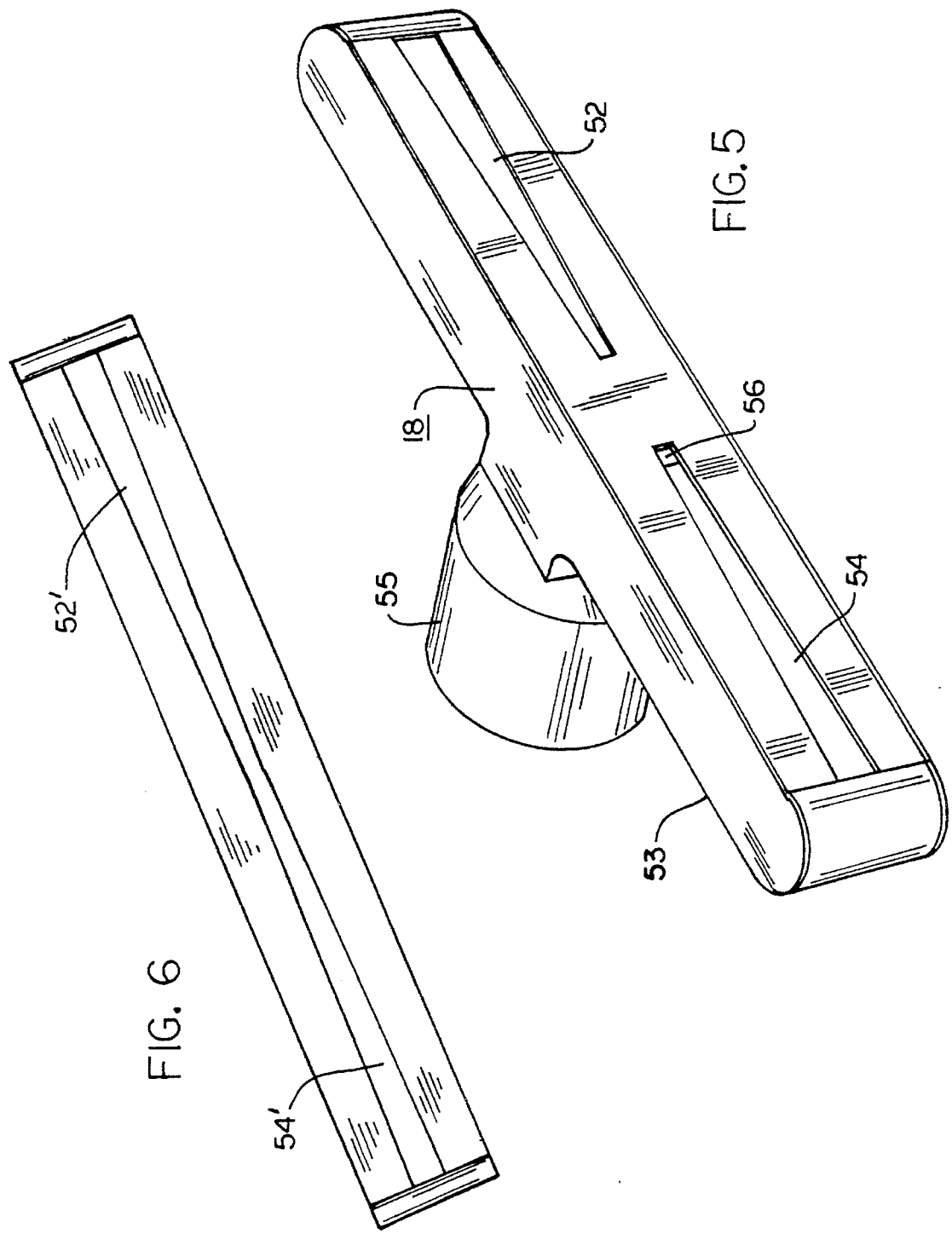

PRE-FILTER WITH ROTATING NOZZLE

BACKGROUND OF THE INVENTION

The present invention relates to an improved pre-filter for removing larger lint particles from an air stream prior to filtration of smaller particles, dust, and other contaminants by a conventional filter apparatus, and to a rotating nozzle for use in cleaning filter screens.

Textile manufacturing plants generate a large quantity of lint, i.e., fiber pieces, which must be removed from the work environment to ensure worker comfort and safety.

Removal is normally achieved by withdrawing lint containing air from the work area and conveying it through a filtration system where the lint is collected on filters. An example of the apparatus used is to be found in U.S. Pat. No. 5,114,444 to Stüble. Normally, the filtration apparatus is comprised of a housing enclosing a plurality of filters, e.g., of the drum or bag type, and a fan to convey air through the filters. When air passes through the filter surface, lint is deposited on the filter. Periodically, the filter surface is vacuumed or back-flushed to remove lint, which is collected by a lint separator.

A concern of air filtration systems collecting large particles, such as lint, heavy sawdust and the like, is that larger particles collecting on the filter surface, clog the surface too quickly, and thus reduce the filtration efficiency. Also, at least in the case of lint, the larger lint particles are reusable, and it is helpful to remove them separately from the smaller unusable lint particles and dust. One approach to addressing this concern is to first pass the lint containing air through a screen (pre-filter) which will collect larger particles. U.S. Pat. No. 4,364,755 to Ferri, for example, shows an apparatus including a circular screen or disk having relatively large pores or openings (100–250 microns) attached to the incoming or intake end of a filter drum. Air passes through the screen prior to entering the drum which contains a higher mesh filter (1–15 microns). Particles collecting on the screen, which is caused to rotate past a stationary nozzle, are removed by the nozzle adjacent the screen surface.

The disadvantage of this system, however, is that the screen must rotate to effect cleaning. The screen is relatively large and the rotation of such a large screen presents problems, such as maintenance of an air seal, energy usage, and the like. Also since the screen rotates at the same speed as the suction apparatus which cleans the inside of the drum filter, there is no independent control over the speed of movement of the screen relative to the vacuum arm. Thus effectiveness of the lint removal from the screen is diminished.

The objectives of the present invention are to provide a method and apparatus for efficiently removing larger lint particles from an air stream prior to filtration of the dust and finer particles from the air stream, which permits improved control of the prefiltration operation independent of the subsequent filtration of the fines from the airstream.

Further, although the ensuing description is directed to a system for lint removal, the same concepts apply to other types of filters where the size of the contaminating particles varies through a wide range, and it is necessary or desirable to pre-filter and collect larger particles upstream of the conventional filtration operation.

Even further, the present invention includes a unique suction nozzle that rotates about an axis, thus providing effective cleaning of a large surface area.

SUMMARY OF THE INVENTION

The objects of the present invention are accomplished by a lint pre-filtration system which first directs lint containing air through a pre-filter screen to remove larger lint particles from the air prior to the time the air is passed through the conventional filtration system where smaller lint particles and dust are removed. Lint collected on the screen is continuously removed by a vacuum nozzle moveable across the screen surface. The lint is then conveyed from the nozzle to a lint separator for removal of lint. Cleaned air is redirected through a conduit to the pre-filter.

More specifically, the pre-filtration apparatus includes an enclosed pre-filter housing which receives lint containing air from a remote source through an inlet opening, and exhausts the air to a filtration system through an exhaust outlet or downstream wall, covered by a lint collection screen which collects lint on the inner surface thereof.

The screen is preferably comprised of a relatively small mesh upstream screen supported by a larger mesh downstream screen. A screen support frame supports both screens in position to provide strength and reduce flexing. The lint collects on the upstream screen while the downstream screen merely supports the upstream screen during installation and operation. In the preferred embodiment, the screen frame has a given width, e.g., from about 3 to about 10 feet, and a height substantially equal to the given width. A circular screen surface is also possible and would have an equal diameter in all directions.

Another aspect of the present invention is a rotatable, T-shaped lint removal collection nozzle which, when used in the pre-filter combination, is positioned within said housing adjacent the upstream surface of the pre-filter screen. The nozzle is configured as an elongated nozzle housing having an inlet wall, an outlet wall, a pair of spaced opposed end walls, and a pair of spaced opposed side walls, The inlet wall is positioned in a plane parallel to the screen, and contains a lint inlet for receiving lint from the inner surface of the screen. The lint inlet has a length substantially equal to the width of the screen, so the lint can be removed from substantially the entire width of the screen with the exception of the corners. The outlet wall is opposite the inlet wall, so that air leaves the nozzle opposite the entrance centrally of the nozzle.

In one embodiment of the invention, the lint inlet is comprised of a pair of inlet slots which extend from opposed ends toward a center divider or insert. In an alternative embodiment the inlet slot extends entirely along the length of the nozzle from one outer edge to the other. The cross section of the slot tapers or increases toward the outer ends of the nozzle to equalize pressure. Lint is drawn from the vacuum nozzle through a return lint air conduit extending from the interior of the nozzle housing through the outlet to the exterior of the pre-filter housing by an exhaust fan.

The T-shaped vacuum nozzle is rotated around substantially the entire surface of the collection screen by a motor or other suitable drive means. In the preferred embodiment, the return lint air conduit is rotatably attached to the vacuum nozzle and the drive means is adapted to rotate the attached nozzle about an axis equidistant from said ends and vertical to said screen. A drive means is connected to a nozzle drive tube, which connects the nozzle to the return lint air conduit, so that substantially all of the return lint air conduit remains stationary with respect to the rotation of the lint collection nozzle.

The lint-laden airstream is discharged from the exhaust fan through a lint collector or separator, which removes lint from the air stream and collects it upon a roll from which it is stripped. The remaining air is then returned to the pre-filter housing.

BRIEF DESCRIPTION OF THE DRAWINGS

FIG. 5 is a perspective view of a first form of the vacuum nozzle.

FIG. 6 is a front view of an alternative vacuum nozzle.

DETAILED DESCRIPTION OF THE PREFERRED EMBODIMENT

Figure 1:
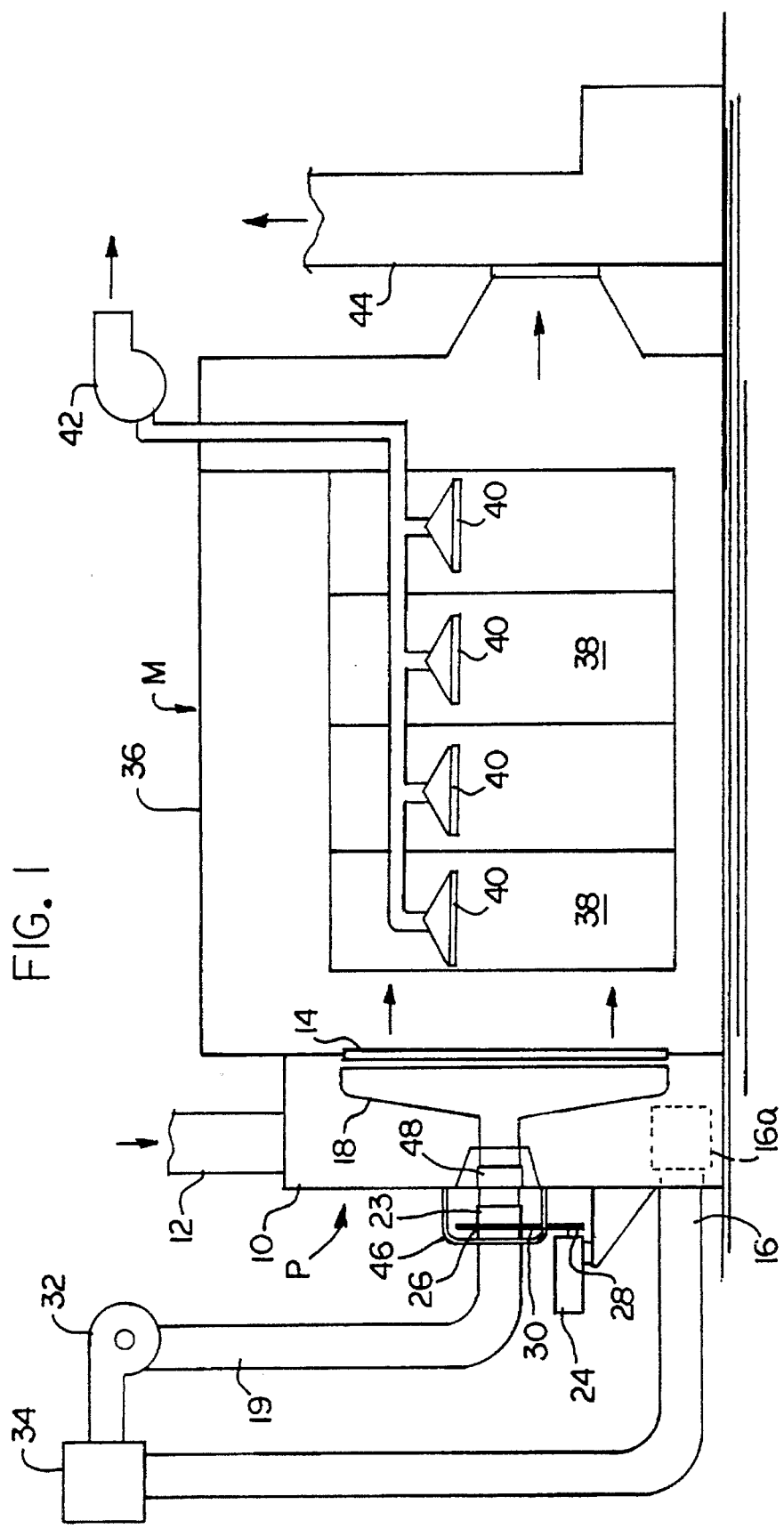
FIG. 1 is a schematic side view of a filtration system having the pre-filter feature of the present invention.
Figure 2:
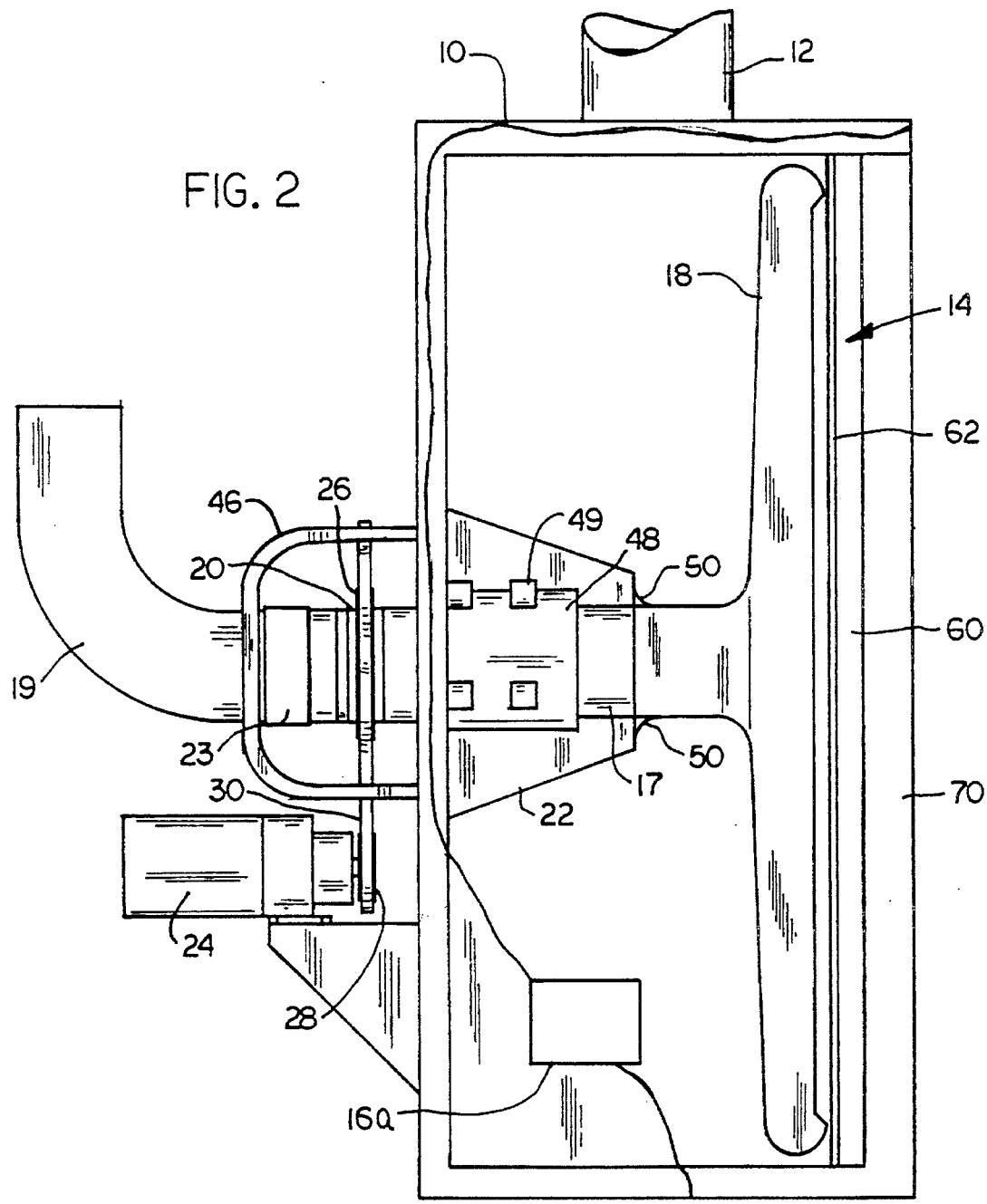
FIG. 2 is a detailed side view of the prefiltration apparatus.
Figure 3:
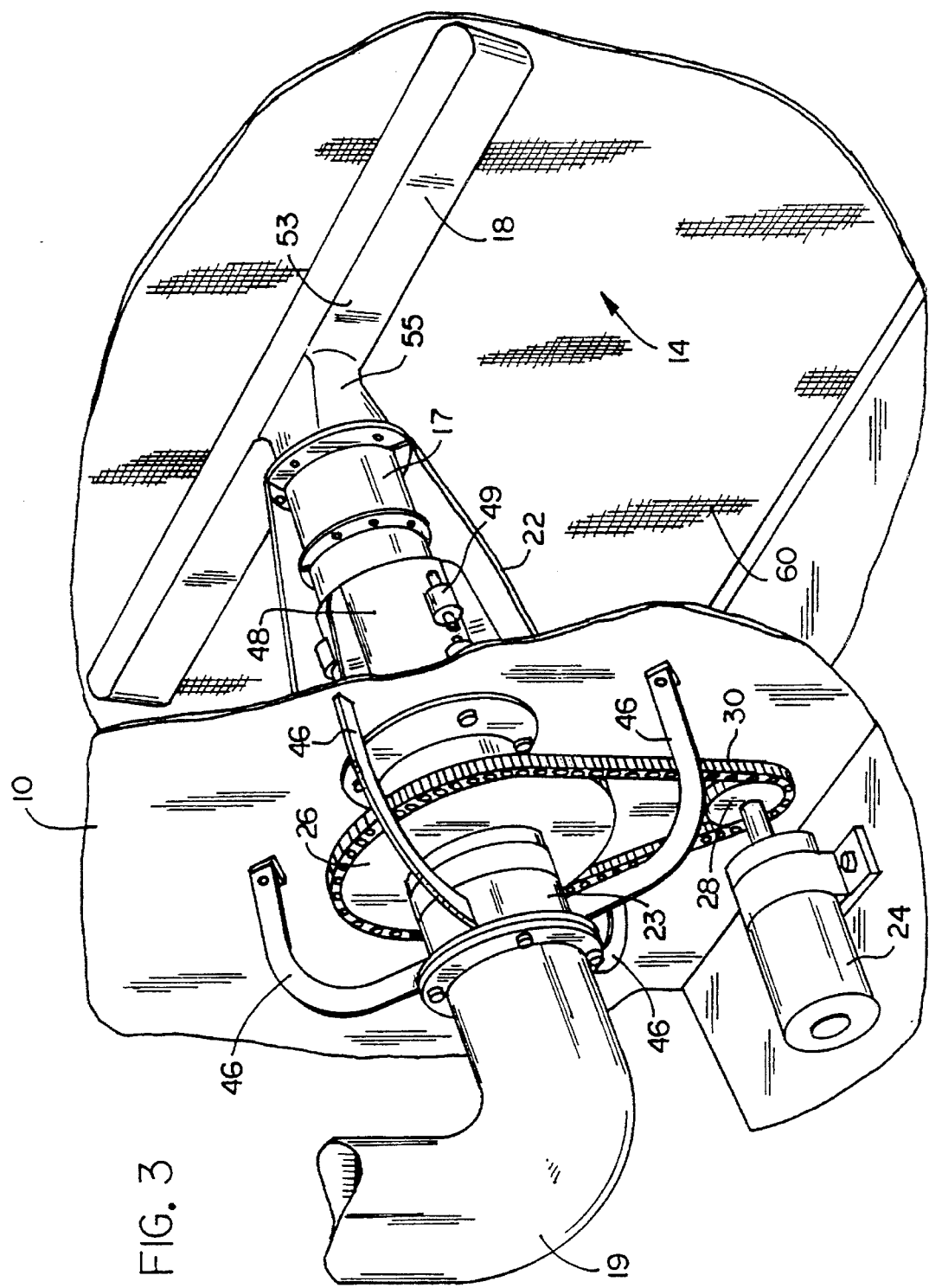
FIG. 3 is a perspective view of the prefiltration apparatus of FIG. 2.

As illustrated in FIGS. 1–3, the pre-filter P of the present invention is used in association with a main filter M of a known configuration. The pre-filter includes a housing 10 with an air inlet 12 in one wall for entry of air collected from a manufacturing operation and containing long pieces of lint, short pieces of lint, fibers and dust. A screen 14 is positioned in one wall of housing 10 in communication with the main filter system. A primary fan 44 associated with the main filtration system provides the negative air pressure necessary to draw the dirty air from the manufacturing area and into the pre-filter and main filter. The vacuum nozzle 18 of the present invention is supported within housing 10 adjacent the upstream surface of screen 14 for removal of lint collected on the screen surface as will be later described.

Vacuum nozzle 18 is connected to the inlet end of an air removal air conduit 19 by a rotatable nozzle drive tube 17 which is received in sealed rotating relation to a stationary seal tube 23. The drive tube 17 connects the nozzle 18 with the lint air removal conduit 19 and is also connected for rotation to motor 24. Nozzle 18 is secured to drive tube 17 to rotate therewith, however, lint removal air conduit 19 does not rotate. A dust cover 22 is positioned about drive tube 17 within housing to prevent dust from entering the drive mechanism. A variable speed drive motor 24 is operatively connected to drive tube through sprockets or pulleys 26 and 28 and chain or belt 30 to rotate drive tube 17 and nozzle 18. Sprocket 26 is mounted on drive tube 17 by means of a connecting collar 20.

Lint collected on the upstream surface of screen 14 is drawn into nozzle 18 and through conduit 19 by exhaust fan 32, which conveys the air and lint to a lint separator 34, which separates the lint from the air. The cleaned air is then directed through a clean air return conduit 16 and through a clean air inlet 16a to the interior of pre-filter housing 10.

While the main filter portion may assume many configurations, a typical setup is illustrated schematically in FIG. 1. Air exiting housing 10 through screen 14 enters a main filter housing 36 and passes though filter bags 38 to remove smaller lint particles. Bags 38 are periodically cleaned by dust strippers 40, which direct dust laden air through an exhaust fan 42 to a dust collector, not shown. Exhaust fan 44 initially draws air through housing 10 and then through housing 36.

As shown in greater detail in FIG. 2, lint/air removal conduit 19, drive tube 17 and nozzle 18 are supported by an external support frame 46 and an internal support bearing 48 which includes a plurality of roller bearings 49 in contact with the exterior of drive coupling 20. A dust seal 50 mounted on dust cover 22 prevents lint and other material from clogging support 46 and bearings 48.

Figure 4:
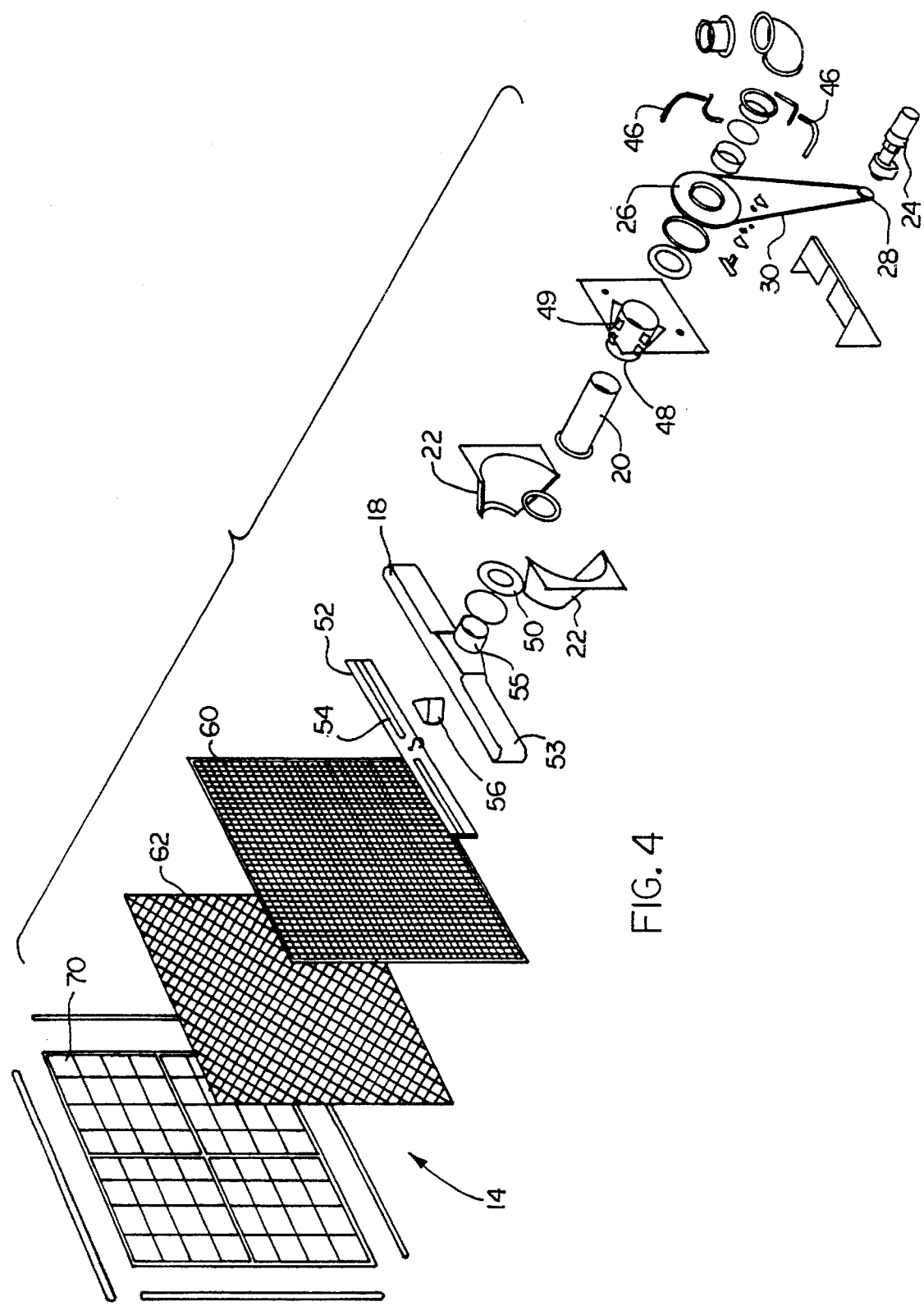
FIG. 4 is an exploded perspective view of the prefiltration system with the housing removed for clarity.

As seen in FIGS. 4–6, vacuum nozzle 18 includes a front inlet wall 52 which has a lint inlet 54 (FIG. 5) or 54' (FIG. 6). A nipple 55 extends from the rear wall 53 of nozzle 18 opposite inlet wall 54 in a direction perpendicular to the longitudinal axis of the nozzle 18. The nipple is connected to drive tube 17. In the embodiment shown in FIG. 5, lint inlet 54 includes a pair of elongated openings or slots which extend from the opposed ends toward a center divider or insert 56. In the alternative embodiment shown in FIG. 6, inlet 54' extends along the entire length of nozzle 18 from one end to the other. The width of inlet 54' increases toward the outer ends of nozzle 18 in an attempt to equalize pressure along the length.

Screen 14 is preferably comprised of an upstream lint-separating screen 60 (30–70 mesh) and a downstream support screen (approximately 1"×1" openings) segment 62 assembled in a screen frame 70. Screens 60 and 62 may be formed from a wire mesh or mesh formed from synthetic material.

While the apparatus has been described as being used to remove lint from an airstream, it will be obvious that it may be used in removing other types of airborne particles where the size variance makes a pre-filter more desirable. Also, the rotating nozzle may have utility in many environments where the surface of a screen is desired to be continuously cleaned. Further, it should be understood that various modifications and variations can be made without departing from the spirit and scope of the invention, which is set forth in the claims below.

What is claimed is:

1. A pre-filter for removing lint, longer fibers, and other larger particles from an air stream entering a primary filter system comprising:

(a) an enclosed housing having an air inlet for receiving contaminated air from a remote manufacturing source and an air outlet in communication with said primary filter system;

(b) a collection screen covering said air outlet, said collection screen having a pore size such that larger particles are collected thereon and smaller particles and dust pass therethrough into said primary filter system, said screen having an interior surface within said housing and an exterior surface in the direction of said filter system;

(c) a particle removal nozzle within said housing, said nozzle having a large particle inlet adjacent said screen interior surface;

(d) an air conduit having an intake opening communicating with said nozzle;

(e) an exhaust fan having an intake opening communicating with said air conduit to draw lint containing air from said nozzle through said air conduit; and (f) drive means for moving said nozzle across the interior surface of said screen.

2. The apparatus of claim 1, further comprising a lint separator for removing lint and longer fibers from air exiting said exhaust fan and an air return conduit to return air exiting said exhaust fan to the interior of said housing after removal of said particles.

3. The apparatus of claim 1, wherein said particle removal nozzle includes a longitudinal axis and comprises an elongated hollow housing having opposed ends, a front inlet wall and a rear wall, said large particle inlet being positioned in said inlet wall, and an outlet nipple extending from said rear wall along an axis of rotation substantially perpendicular to the longitudinal axis of said nozzle.

4. The apparatus of claim 3, wherein said large particle inlet comprises a pair of slots having opposed distal ends adjacent opposed nozzle ends and proximal ends adjacent a central divider section separating said slots.

5. The apparatus of claim 3, wherein said large particle inlet comprises a single slot, said slot being tapered toward the middle and wider at each end.

6. The apparatus of claim 3, further including a drive tube connecting said outlet nipple to said air conduit, and wherein said drive means includes a sprocket secured to said drive tube and operatively connected to a motor to rotate said nozzle about said axis of rotation, said drive tube being rotatably received within said air conduit in sealed relation thereto.

7. A rotatable nozzle for continuously cleaning a planar screen and delivering particles removed therefrom to an air conduit, said nozzle comprising:

(a) an elongated hollow housing extending along a longitudinal axis and having a front inlet wall defining a plane parallel to the surface to be cleaned, a rear wall opposite said front wall, and opposed ends;

(b) an inlet in said front wall and an outlet nipple extending from said rear wall at a point substantially central of the two ends and along an axis of rotation substantially perpendicular to said longitudinal axis of the nozzle;

(c) a drive tube connecting said outlet nipple to said air conduit; and a drive means for rotating said drive tube and nozzle about said axis of rotation and relative to said air conduit and planar surface.

8. The nozzle of claim 7, wherein said inlet comprises a pair of slots having opposed distal ends adjacent opposed nozzle ends and proximal ends adjacent a central divider section separating said slots.

9. The nozzle of claim 7, wherein said inlet comprises a single slot, said slot being tapered toward the middle and wider at each end.

10. The rotatable nozzle according to claim 7 wherein said drive means includes a sprocket secured to said drive tube and operatively connected to a motor, said drive tube being rotatably received within said air conduit in sealed relation thereto.

* * * * *